Patented May 16, 1950

2,508,043

UNITED STATES PATENT OFFICE 2,508,043

PROCESS FOR MAKING BATTERY SEPARATORS

John F. Schaefer, Milwaukee, Wis., assignor to Globe-Union Inc., Milwaukee, Wis., a corporation of Delaware No Drawing. Application December 28, 1944, Serial No. 570,226

1 Claim. (Cl. 92—21)

This invention relates to improvements in compositions of matter and in processes for making the composition.

Natural growths, such as wood, are fibrous with natural resins and lignins joining the fibers. And natural wood, even though it has been cleaned of its bark and knots, still contains materials which form acids under certain conditions. Such acids are acetic acid and other acids, frequently volatile, which are calculated as acetic acid (see Bureau of Standards Research Paper 267, published 1931, 6 J. of Res. 169). Hence, when a natural material, such as wood, is to be used, for example, as separators for the plates of electric storage batteries, the wood must be carefully selected as to species and quality, the separators must be treated to remove as much of the acid-forming constituents therefrom as possible, and the treated separators must then be selected for perfection in shape and uniformity in other characteristics, all of which requires considerable time and results only in a structure still subject to many defects.

Battery separators must be resistant to the electrolyte acid, must have a low electrical resistance per unit area when immersed in electrolyte, and must have tensile strength, both when dry and when wet, sufficient to permit storage and handling, and particularly should be free from material deleterious to the several elements of the battery while it is being charged or discharged. The above qualities are also useful for many purposes other than as battery plate separators, or advantage may be taken of such qualities to produce further modified materials, as will be described hereinafter.

It is one object of the present invention to provide a composition of matter formed from a natural fiber and employing a natural resin for retaining objects made from such natural fibers in their predetermined shape.

Another object of the invention is to provide a natural fiber from which constituents harmful in the use of the product are removed and in which the resins of the natural material are retained to agglomerate the fiber in the form desired.

Another object of the invention is to provide a composition employing both the fiber and the resins of a natural growth and at least a part of the lignin of the growth to supplement the natural resins in producing the desired characteristics of the composition.

A further object of the invention is to provide a process for modifying a natural fibrous product to remove constituents which are deleterious to the final use of the product while retaining the natural resinous materials in the product.

Another object of the invention is to provide a process for treating a naturally fibrous and resinous material to retain the fiber and the resin, a step of the process removing undesirable constituents of the material and redistributing the natural resinous materials among the fibers.

Another object of the invention is to provide a method for treating a natural fibrous growth to retain the fiber and the natural resin therein in modified form and to supplement such resin by utilizing the lignin to produce the desired characteristics in the final product.

The present invention relates to a modified natural material and a process for making the same by which the above stated qualities may be realized in a controllable manner so that the product may be adapted to many different purposes.

Wood of any species, but preferably spruce, is mechanically separated into its component fibers as completely as possible. Any known grinder or defiberizing device may be used to secure fiber separation but no chemical fiber-separating means may be employed. It will be understood that the present process also applies to natural fibrous growths other than wood, such as bagasse, corn stalks, straw, and similar material, now generally considered waste but which is formed of cellulose fibers bound by natural resins and lignins. Used newsprint may also be employed for the reason that the pulp used in newsprint paper, even though partially formed by a chemical process, is so treated that the major portion of the natural resins remain in the pulp. Color being immaterial in the product, the newsprint need only be re-pulped for treatment by the present process.

The mass of separated fibers is treated with a sodium hydroxide solution which may be a 1–5% concentration dependent on the characteristics of the wood. The concentration of the caustic and the quantity used is entirely dependent on the wood used. It has been found that a 2% concentration is satisfactory for spruce wood. A sufficient quantity of the alkali is used to produce a final pH of 10–12. The mass is thoroughly stirred while the alkali is being added. The mixture, which is now a relatively thick slurry, is kept just above the boiling point or slowly boiling for a sufficient length of time to dissolve all of the natural resin and some of the lignin in the wood and also to dissolve all of the acid-forming constituents in the wood. In practice it has been found desirable to continue the caustic solution treatment of the wood for times up to six hours at atmospheric pressure. It will, of course, be understood, that the temperature may be increased if the material is treated under pressure so long as the above result is obtained.

The slurry, while still hot, has mixed therewith a 50% solution of sulphuric acid in such quantity as to produce a pH of 1 to 3 (or strongly acidic). Agitation of the slurry is continued while the acid is being added and the temperature of the slurry is kept above 160° F. The acid reprecipitates the dissolved natural resins and dissolved lignin fraction of the wood and redistributes such materials substantially uniformly over the fibers. The acid-forming constituents of the wood, however, remain in solution.

The slurry is now washed until substantially neutral and is suspended in sufficient water to form pulp of a consistency which may be shaped into sheets by the usual fibre board- or paper-making machines and methods, or into objects of other dimensions by moulding or extruding, as is well known. For use as battery separators, the sheets are preferably made approximately .05" thick and embossed in a suitable manner to promote the circulation of the electrolyte in the battery cell.

The shaped objects are now dried. If the drying is done as a separate step in the process, a relatively low moisture content, which is preferably approximately ½ of 1% but in any event does not exceed 6%, is obtained. However, if the drying step and the curing step (described below) are combined into a single step, no moisture content limits need be observed. The rate at which the water is abstracted from the objects is determined only by the dimensions of the objects and is kept as high as possible consistent with preventing physical damage to the objects. It has been found that a temperature of approximately 220° F. is practical, in batch operations, in removing moisture and may be applied until the above limits of moisture content are attained.

The dried objects are cured at atmospheric pressure at temperatures ranging from 250° F.–450° F. for one-half to fifteen hours dependent on the required final porosity and on the electrical resistance desired. The curing converts or sets the precipitated resins. During such conversion, the resin apparently passes through the plastic stage so that a flow occurs over the fibers which aids in redistributing the resin and causes joining of substantially all of the fibers at their points of contact, upon setting of the resin. It is possible that curing commences during the drying step, but in any case the end of the curing step can be readily determined by measurement of the electrical resistance which ideally ranges from .04 to .09 ohm per square inch. Lower resistance values can be obtained at a sacrifice of mechanical strength. In a quantity production operation, the drying and curing are combined into a single continuous operation with such temperature control in the different zones in a drying and curing kiln or at drying and curing rolls that the sheets will not warp during either the drying or curing steps of the process. If the sheets are positively held flat, the drying temperature may be considerably increased over the upper temperature limit above given.

The final step of the process is cutting or trimming the objects to exactly desired size, such cutting being performable by the usual paper and wood-cutting tools.

For some uses of the product, or in some woods, the amount of dissolved natural resins and lignins in the wood is not sufficient to produce the qualities desired. Under such conditions a resin is added to supplement the natural resin or lignin of the wood and in sufficient quantity to obtain the desired product, as will be described. It is necessary only that the resin be compatible with the precipitated wood resin. But for some uses it is also necessary that the supplemental resin be acid- and/or alkali-resistant.

The degree of acid or alkali resistance of the final product, and its electrical resistance per unit of area, are directly proportional to the amount of resin employed and to the degree to which such resin bonds the fibers themselves. Acid and alkali resistance are determined by test and visual inspection and electrical resistance is determined by the known methods. The porosity of the final product is dependent in part upon the method of separating the fiber and dispersing the pulp prior to the chemical treatment for dissolving the resins and the lignins present and for securing their precipitation, upon the conditions under which the chemical treatment is carried out, upon the quantity of resins present and upon the temperature and time during which the curing process is carried out. Porosity is determined by densometer as is well known in the paper-making industry.

The tensile strength is directly dependent upon the degree and the uniformity with which the fibres are coated and joined. Tensile strength is determined by the usual methods and is greatly increased by the addition of a long fibered pulp, such as kraft pulp, of which up to 25% may be used. The addition of chemical pulp, of course, reduces the concentration of resin in the product. But such effect may, for some purpose, be outweighed by the increased tensile strength obtained. It has been found that the final properties of the product may be varied by varying the process, as above indicated, from the values shown in the following table which are applicable to battery separators only:

TABLE

| Curing | | Electrical Resistance, Ohms/Sq. In. | Porosity | Tensile Strength, Lbs./Sq. In. | |
|---|---|---|---|---|---|
| Temp. | Time | | | Dry | Wet |
| °F. | Hours | | | | |
| None | ---- | 0.043 | 85 | 645 | 143 |
| 250 | 15 | .058 | 104 | 710 | 155 |
| 350 | 1 | .046 | 118 | 1,030 | 225 |
| 350 | 2 | .073 | 120 | 823 | 355 |
| 350 | 3 | .062 | 122 | 1,093 | 572 |
| 400 | 1 | .132 | 131 | 688 | 300 |
| 450 | 1 | .194 | 111 | 675 | 410 |

It will be apparent from the above description that the present material may be further modified by loading the pores of the material with lubricants, metals, abrasives, or earths, thereby producing a final product capable of many diverse uses in which the above qualities are desirable. If the sheets are pressed during the curing process, a smooth-surfaced paper-like product results which is highly resistant to water penetration and which has a tensile strength when wet materially greater than above shown.

Although but one embodiment of the present

I claim:

The process of making battery separators which consists in cooking ground wood pulp in a NaOH solution of between 1 and 5% concentration at atmospheric pressure until the acid-forming constituents and resinous material present therein are dissolved and a final pH reading of between 10 and 12 is obtained, agitating the resultant slurry and, while maintaining the same at a temperature above 160° F., adding thereto $H_2SO_4$ until a pH reading of between 1 and 3 is obtained to thereby precipitate the dissolved natural resins and lignin substantially uniformly onto the fibers of the pulp, washing the pulp thoroughly free of the acid and acid-forming constituents, forming the washed pulp into a sheet, drying the sheet under atmospheric pressure at a temperature of approximately 220° F. and subjecting it to a temperature between 250° F. and 450° F. at atmospheric pressure to cause the resinous precipitate to flow and become more uniformly distributed throughout the fibers of the sheet to fix the tensile strength, porosity, acid resistance, and electical resistance of the sheet at predetermined values.

JOHN F. SCHAEFER.

REFERENCES CITED

The following references are of record in the file of this patent:

UNITED STATES PATENTS

| Number | Name | Date |
|---|---|---|
| 119,464 | Keen | Oct. 3, 1871 |
| 128,978 | Reed | July 16, 1872 |
| 1,389,936 | Clapp | Sept. 6, 1921 |
| 1,501,925 | Shaw | July 22, 1924 |
| 1,614,025 | Conner | Jan. 11, 1927 |
| 1,634,603 | Wood | July 5, 1927 |
| 1,682,834 | Dedrick | Sept. 4, 1928 |
| 1,716,623 | Collins | June 11, 1929 |
| 1,792,254 | Smyser | Feb. 10, 1931 |
| 1,873,056 | Smith | Aug. 23, 1932 |
| 2,247,208 | Schorger | June 24, 1941 |
| 2,343,215 | Farber | Feb. 29, 1944 |

FOREIGN PATENTS

| Number | Country | Date |
|---|---|---|
| 8,325 | Great Britain | of 1909 |

OTHER REFERENCES

Paper Trade Journal, May 2, 1940, pp. 35 to 38.